United States Patent
Chan et al.

(10) Patent No.: US 8,781,122 B2
(45) Date of Patent: Jul. 15, 2014

(54) ELEMENTARY BITSTREAM CRYPTOGRAPHIC MATERIAL TRANSPORT SYSTEMS AND METHODS

(75) Inventors: Francis Yee-Dug Chan, San Diego, CA (US); Kourosh Soroushian, San Diego, CA (US); Andrew Jeffrey Wood, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 628 days.

(21) Appl. No.: 12/946,631

(22) Filed: Nov. 15, 2010

(65) Prior Publication Data

US 2011/0135090 A1     Jun. 9, 2011

Related U.S. Application Data

(60) Provisional application No. 61/266,982, filed on Dec. 4, 2009.

(51) Int. Cl.
*H04L 29/06* (2006.01)

(52) U.S. Cl.
CPC .......... H04L 65/607 (2013.01); H04L 63/0428 (2013.01)
USPC ............................................. 380/210; 380/37

(58) Field of Classification Search
CPC ......................... H04L 65/607; H04L 63/0428
USPC ............................ 382/100; 380/37, 200, 210
See application file for complete search history.

(56) References Cited

U.S. PATENT DOCUMENTS

| | | |
|---|---|---|
| 2003/0035545 A1 | 2/2003 | Jiang |
| 2003/0035546 A1 | 2/2003 | Jiang et al. |
| 2004/0081333 A1* | 4/2004 | Grab et al. .................... 382/100 |
| 2004/0105549 A1 | 6/2004 | Suzuki et al. |
| 2007/0255940 A1 | 11/2007 | Ueno |
| 2009/0097644 A1 | 4/2009 | Haruki |

FOREIGN PATENT DOCUMENTS

WO     2011/068668 A1    6/2011

OTHER PUBLICATIONS

International Search Report and Written Opinion for International Application No. PCT/US2010/56733, International Filing Date Nov. 15, 2010, Search Completed Jan. 3, 2011, Mailed Jan. 14, 2011, 9 pgs.

* cited by examiner

*Primary Examiner* — Hadi Armouche
*Assistant Examiner* — Dao Ho
(74) *Attorney, Agent, or Firm* — KPPB LLP

(57) ABSTRACT

Systems and methods for providing multimedia content from one process or component to another process or component over an unsecured connection are provided. One embodiment includes obtaining the cryptographic information, extracting the at least partially encrypted video data from the container file to create an elementary bitstream, enciphering the cryptographic information, inserting the cryptographic information in the elementary bitstream, providing the elementary bitstream to a video decoder, extracting the cryptographic information from the elementary bitstream at the video decoder, deciphering the cryptographic information, decrypting the elementary bitstream with the cryptographic information and decoding the elementary bitstream for rendering on a display device using the video decoder.

24 Claims, 8 Drawing Sheets

ELEMENTARY BITSTREAM CRYPTOGRAPHIC MATERIAL TRANSPORT SYSTEMS AND METHODS

CROSS-REFERENCE TO RELATED APPLICATIONS

The current application claims priority to U.S. Provisional Patent Application No. 61/266,982, filed Dec. 4, 2009, the disclosure of which is incorporated herein by reference.

BACKGROUND

The present invention generally relates to digital multimedia distribution systems and more specifically to digital transmission of encrypted multimedia content over an unsecured connection.

Providers of multimedia content can digitize content for distribution via digital communication networks. An important issue faced by a content distribution system is enabling only those customers that have purchased the content to play the content and compartmentalize access to all the stakeholders in the content distribution chain. One approach is to encrypt portions of the content and to issue encryption keys to authorized users that enable encrypted portions of the content to be unencrypted. Layers of keys and protection policies can be used so a single encryption key alone is insufficient for the user to access the content. In a number of systems, users purchase players that possess specified decryption capabilities. Content providers can distribute content to user's owning such a player in an encryption format supported by the player. Complying with a specified protection policy typically involves using an encryption key specified by the manufacturer of the players. In many instances the manufacturer of the players will not reveal the encryption keys used in the specified encryption scheme and likewise the content provider does not want to share the content keys to the manufacturer of the players.

Communications between components or processes of players or playback systems are typically trustworthy and secured. However, when communication or the transporting of information becomes unsecured or untrustworthy, such gaps need to be accounted for and filled. This has become more evident with advent and popularity of open multimedia frameworks. Bi-directional communication requirements and/or run time challenges and authentication requests to fill such gaps have proved to be less than adequate.

There are many ways of securing communication, including ciphering and encryption.

Ciphering is a procedure used to secure data that typically involves using a series of steps to scramble and render the data readable only to the intended audience. The procedure itself does not require an outside source, such as a key, in order to encipher or decipher the data. Rather, data can be properly deciphered by the intended audience so long as deciphering exactly follows the enciphering steps to unravel the data. Encryption is a procedure used to secure data. That typically involves the use of an external input for at least one step in the procedure, such as a key, in order to secure and/or access the data. The external data is used to intentionally manipulate at least one step in the encryption or decryption process, changing the way the data processing for encryption occurs. Generally, without the external data or a corresponding decryption key in an encryption process, a step in a corresponding decryption process cannot properly be executed and the data cannot be properly decrypted.

In the context of digital media, encoding is a procedure by which digital media is represented in a digital format. The format is typically selected to obtain specific benefits during the transportation, playback and storage of the digital media format used. For example, representing the media using fewer bits may be beneficial to transfer data in order to minimize bandwidth usage or storage space. In another example, a media player may only decode or read media in a certain format and therefore the digital media may first be in that format in order to be decoded by that media player.

Decoding is a procedure by which digital media in a format is translated into a format readable by a media player for rendering on a display device. Often, decoding may also reverse processes associated with encoding such as compression. In instances where encryption and/or enciphering have been applied to encoded media, the enciphering process or encryption process typically must be reversed before the encoded media can be decoded.

SUMMARY OF THE INVENTION

Systems and methods are described for taking cryptographic material from a container file and inserting the cryptographic material in an elementary bitstream, where the cryptographic information can then be used to decrypt the elementary bitstream for playback A number of embodiments include obtaining the cryptographic information, extracting the at least partially encrypted video data from the container file to create an elementary bitstream, enciphering the cryptographic information, inserting the cryptographic information in the elementary bitstream, providing the elementary bitstream to a video decoder, extracting the cryptographic information from the elementary bitstream at the video decoder, deciphering the cryptographic information, decrypting the elementary bitstream with the cryptographic information and decoding the elementary bitstream for rendering on a display device using the video decoder.

In a further embodiment, the cryptographic information is obtained from the container file.

In another embodiment, the cryptographic information includes key information and information concerning at least a portion of the at least partially encrypted video data that is encrypted using the key information.

In an additional embodiment, information concerning at least a portion of the at least partially encrypted video data is a reference to a block of encrypted data within an encoded frame of video that is encrypted using the key information.

In a still further embodiment, the cryptographic information inserted in the elementary bitstream is delimited by an identifier and the cryptographic information is inserted before the at least partially encrypted video data encrypted using the key information.

In a still other embodiment, the cryptographic information is extracted using the identifier.

In a still additional embodiment, the decrypting process is performed by using the key information to identify the encrypted portion of video data and decrypting the encrypted video data using the key information.

In a yet further embodiment, cryptographic information inserted in different locations within the elementary bitstream includes different key information.

In a yet other embodiment, the at least partially encrypted video data includes frames of encoded video. In addition, the at least partially encrypted video data includes at least a portion of a plurality of the encoded frames that is encrypted.

In a yet further additional embodiment, the enciphering process and the deciphering process are synchronized such that a delay in excess of a predetermined time between enciphering and deciphering results in the cryptographic information being unrecoverable.

In a still further embodiment again, the enciphering process enciphers data by using a sequence of scrambling processes to scramble data.

In a still other embodiment again, the deciphering process deciphers data by performing the inverse sequence of scrambling processes to the sequence used to scramble the data.

Many embodiments include a demultiplexer configured to extract the at least partially encrypted video data from the container file to create an elementary bitstream, a video decoder configured to decrypt the elementary bitstream using the cryptographic information and decode the elementary bitstream for rendering on a display, device. Additionally, the demultiplexer is configured to encipher the cryptographic information and insert the enciphered cryptographic information in the elementary bitstream and the decoder is configured to extract enciphered cryptographic information from an elementary bitstream and to decipher the cryptographic information.

In a further embodiment, the cryptographic information is obtained from the container file.

In another embodiment, the cryptographic information includes key information and information concerning at least a portion of the at least partially encrypted video data that is encrypted using the key information.

In an additional embodiment, the information concerning at least a portion of the at least partially encrypted video data is a reference to a block of encrypted data within an encoded frame of video that is encrypted using the key information.

In a further embodiment again, the demultiplexer is configured to insert the cryptographic information delimited by an identifier in the elementary bitstream and insert the cryptographic information before the at least partially encrypted video data encrypted using the key information.

In another embodiment again, the decoder is configured to extract the cryptographic information using the identifier.

In an additional embodiment again, the decoder is configured to decrypt the portion of the video data encrypted using the key information by identifying the encrypted portion of video data and decrypting the encrypted video data using the key information.

In a still further embodiment again, cryptographic information inserted in different locations within the elementary bitstream includes different key information.

In still another embodiment again, the at least partially encrypted video data includes frames of encoded video. Additionally, at least a portion of a plurality of the encoded frames is encrypted.

In a still additional embodiment, both the demultiplexer and the decoder are configured to be synchronized such that a delay in excess of a predetermined time between enciphering and deciphering results in the cryptographic information being unrecoverable.

In a yet further embodiment, the demultiplexer is configured to encipher data by using a sequence of scrambling processes to scramble data.

In a yet other embodiment, the decoder is configured to decipher data by performing the inverse sequence of scrambling processes to the sequence used to scramble the data.

Numerous embodiments include obtaining the cryptographic information. In addition, the cryptographic information is obtained from the container file. Also, the at least partially encrypted video data includes frames of encoded video and at least a portion of a plurality of the encoded frames is encrypted. Additionally, the cryptographic information includes key information and information concerning at least a portion of the least partially encrypted video data that is encrypted using the key information. Furthermore, the information concerning at least a portion of the at least partially encrypted video data is a reference to a block of encrypted data within an encoded frame of video that is encrypted using the key information and the cryptographic information inserted in different locations within the elementary bitstream includes different key information.

Several embodiments include extracting the at least partially encrypted video data from the container file to create an elementary bitstream. In addition, the cryptographic information inserted in the elementary bitstream is delimited by an identifier and the cryptographic information is inserted before the at least partially encrypted video data encrypted using the key information.

Many embodiments include enciphering the cryptographic information and inserting the cryptographic information in the elementary bitstream. In addition, the cryptographic information is extracted using the identifier.

A number of embodiments include providing the elementary bitstream to a video decoder, extracting the cryptographic information from the elementary bitstream at the video decoder and deciphering the cryptographic information. In addition, the enciphering process and the deciphering process are synchronized such that a delay in excess of a predetermined time between enciphering and deciphering results in the cryptographic information being unrecoverable. Also, the enciphering process enciphers data by using a sequence of scrambling processes to scramble data. Furthermore, the deciphering process deciphers data by performing the inverse sequence of scrambling processes in the sequence used to unscramble data.

Several embodiments include decrypting the elementary bitstream with the cryptographic information. In addition, the decrypting process is performed by using the key information to identify the encrypted portion of video data and decrypting the encrypted video data using the key information.

Many embodiments include decoding the elementary bitstream for rendering on a display device using the video decoder.

DETAILED DESCRIPTION

Systems and methods for providing multimedia content from one process or component to another process or component over an unsecured connection are provided. In several embodiments, the transmission occurs between a demultiplexer and a decoder over an unsecured connection where traditionally such connections are secured. In many embodiments, the transmission occurs on a bi-directional communication path. Embodiments of the present invention do not secure the transmission but rather secure the data being transmitted via the unsecured connection. The transmitted data in a number of embodiments includes an encrypted multimedia bitstream and associated cryptographic material in the bitstream for transmission to a decoder for decryption. In various embodiments, a bi-directional communication path between a demultiplexer and the decoder is not used. Additionally, by allowing the decryption to occur on the decoder the bitstream is protected even if the connection is compromised and an unauthorized component or process intercepts the bitstream.

In various embodiments, frame keys are used to decrypt the bitstream. For example, in the manner described in U.S. Pat. No. 7,295,673 to Grab et al. the disclosure of which is incorporated by reference herein in its entirety. In several embodiments, the frame keys are protected by a cryptographic wrap algorithm that uses a separate series of newly generated keys. The wrapped frame keys are inserted into the encrypted bit stream for deciphering and decoding by the decoder. The cryptographic information in various embodiments includes information to decrypt a video frame or a portion of the video frame. In various embodiments, a time indicator in the form of a frame sequence is also utilized to ensure connection between the demultiplexer and decoder is not being intercepted or spied upon.

The cryptographic information inserted into the elementary bitstream can take any of a variety of forms. In many embodiments, the cryptographic information includes a frame key and/or a reference to a block of encrypted video data. In several embodiments, the cryptographic information contains an index to a frame key or a separate reference to both a frame key and an encrypted block. A number of embodiments provide for first inserting a table of possible keys and still further embodiments provide for sending multiple keys where different keys are used to encrypt different portions of the video.

Figure 1:
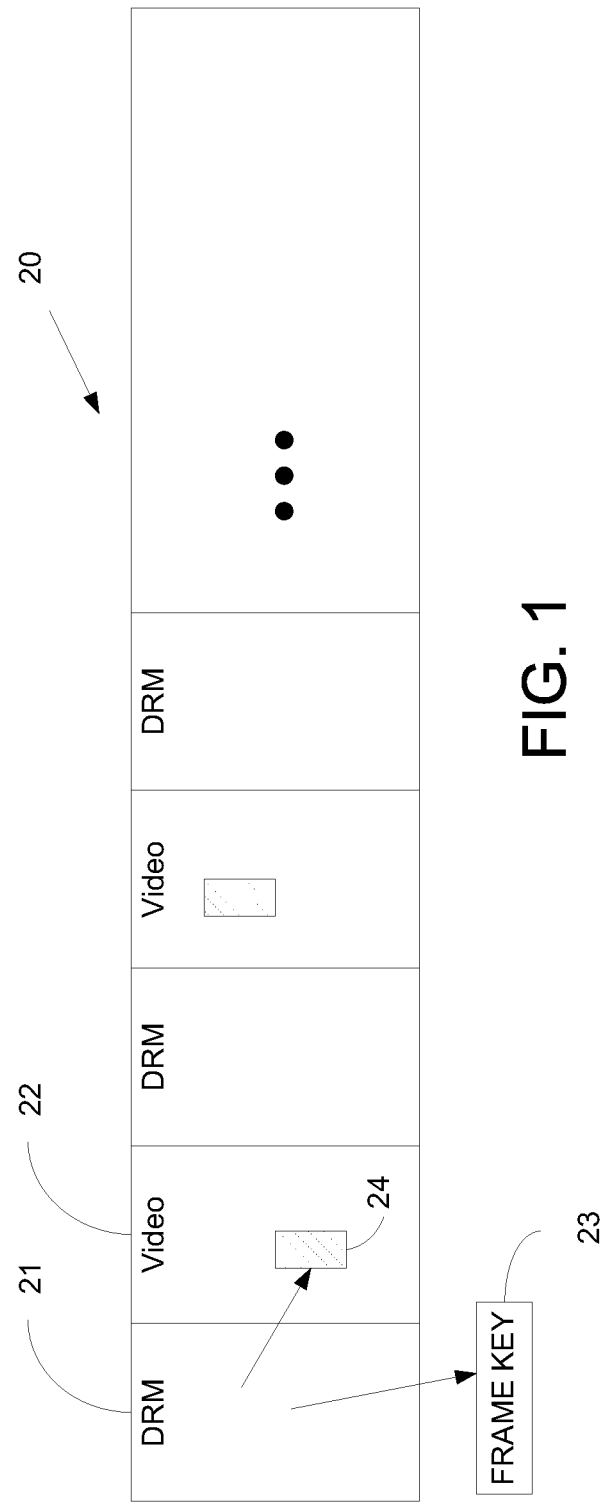
FIG. 1 illustrates a graphical representation of a multimedia container file in accordance with various embodiments of the present invention.

Turning now to the drawings, FIG. 1 represents a multimedia container file 20 including encrypted content, e.g., video. The multimedia container file includes a digital rights management portion 21 preceding associated video portions or chunks 22. The digital rights management portion includes at least one frame key 23 or an index to a frame key in a separately provided table of frame keys, which in many embodiments is encrypted in a way that only enables playback by a particular device and/or user. The digital rights management portion also points to or identifies a specified portion of or an entire video frame within the video chunk 24 that is encrypted. Without first decrypting this encrypted portion of the video chunk, the video content cannot be decoded or displayed. The multimedia container file is supplied to a demultiplexer.

The demultiplexer parses the multimedia container file and transmits portions or chunks of data, e.g., video or audio, to a decoder. However, prior to transmitting the video data, the demultiplexer incorporates or attaches cryptographic material to the video data.

Figure 2:
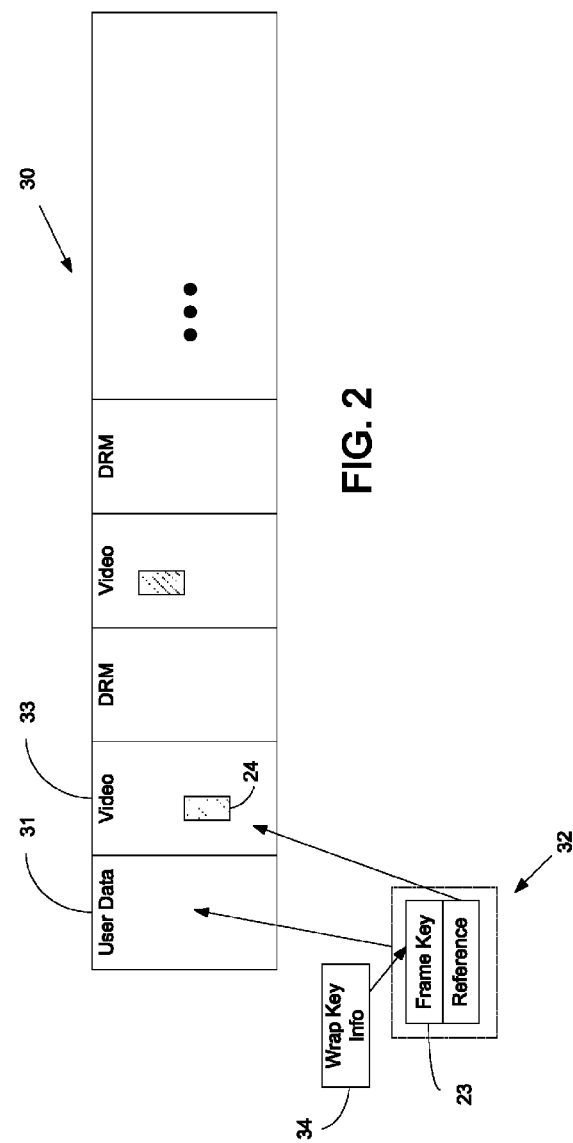
FIG. 2 illustrates a graphical representation of a bitstream with cryptographic material in accordance with various embodiments of the present invention.

FIG. 2 graphically illustrates the generated multimedia bitstream sent to the decoder. The bitstream 30 includes a header or user data 31 that includes cryptographic material 32. In accordance with many embodiments of the invention, the material includes the frame key 23 from the multimedia container file, which is encrypted using a wrap key, and wrap key information 34 to provide synchronization of the demultiplexer to the decoder in order to decipher the cryptographic material. As is discussed below, the wrap key information can take any of a variety of different forms depending upon the specific application including but not limited to information enabling synchronization of wrap key factories and/or the direct transfer of the wrap keys themselves. The associated video data 33 follows.

Figure 3:
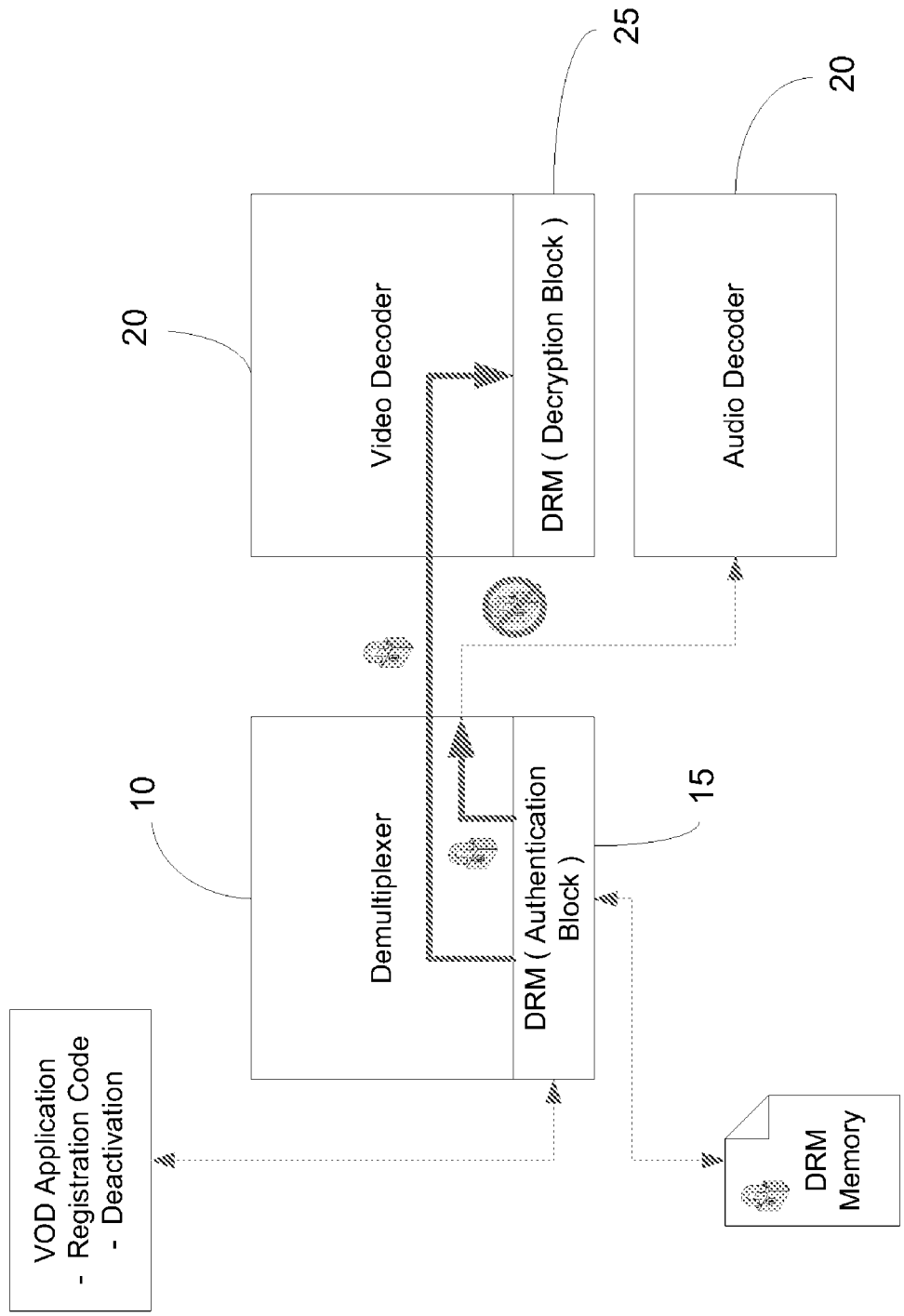
FIG. 3 is a block diagram of a multimedia cryptographic bitstream transport system in accordance with various embodiments of the present invention.

Referring now to FIG. 3, a demultiplexer 10 that receives a multimedia container file that includes video and audio data, portions of which are encrypted, is shown. In one embodiment, the multimedia file conforms to a specific format such as audio video interleave (AVI) or Matroska (MKV). The multimedia file is provided via a disc, flash memory device or another tangible storage medium or streamed or otherwise transmitted to the demultiplexer. The demultiplexer separates portions of the received multimedia data including but not limited to video, audio and encryption data that is supplied to an upstream digital rights management component 15. In various embodiments, the connection between the demultiplexer 10 and the digital rights management component 15 can be secure although need not be depending upon the requirements of the application. The digital rights management component 15 generates cryptographic material and the multimedia bitstream transport that is supplied to a decoder 20. In particular, the demultiplexer 10 transmits video data with cryptographic material to the decoder 20.

The connection between the demultiplexer and the decoder is typically secured. However, in the illustrated embodiment, the connection is not secured. Typically, the multimedia file is authorized and decrypted in a demultiplexer and then transmitted downstream unencrypted to the decoder via an intercommunication data channel. This however can present a security problem due to the high value of the unencrypted but still encoded bitstream that can be captured during transmission. This bitstream is considered high-value since the encoded data can be easily multiplexed back into a container for unprotected and unauthorized views and/or distribution with no loss in the quality of the data. In the illustrated embodiment, the video provided to the decoder 20 by the demultiplexer 10 is at least partially encrypted and the decoder 20 communicates with a downstream digital rights management component 25 that deciphers the cryptographic material. Utilizing the deciphered cryptographic material, the digital rights management component is able to access the encryption data and thereby decrypt and decode the video data for playback.

Figure 4:
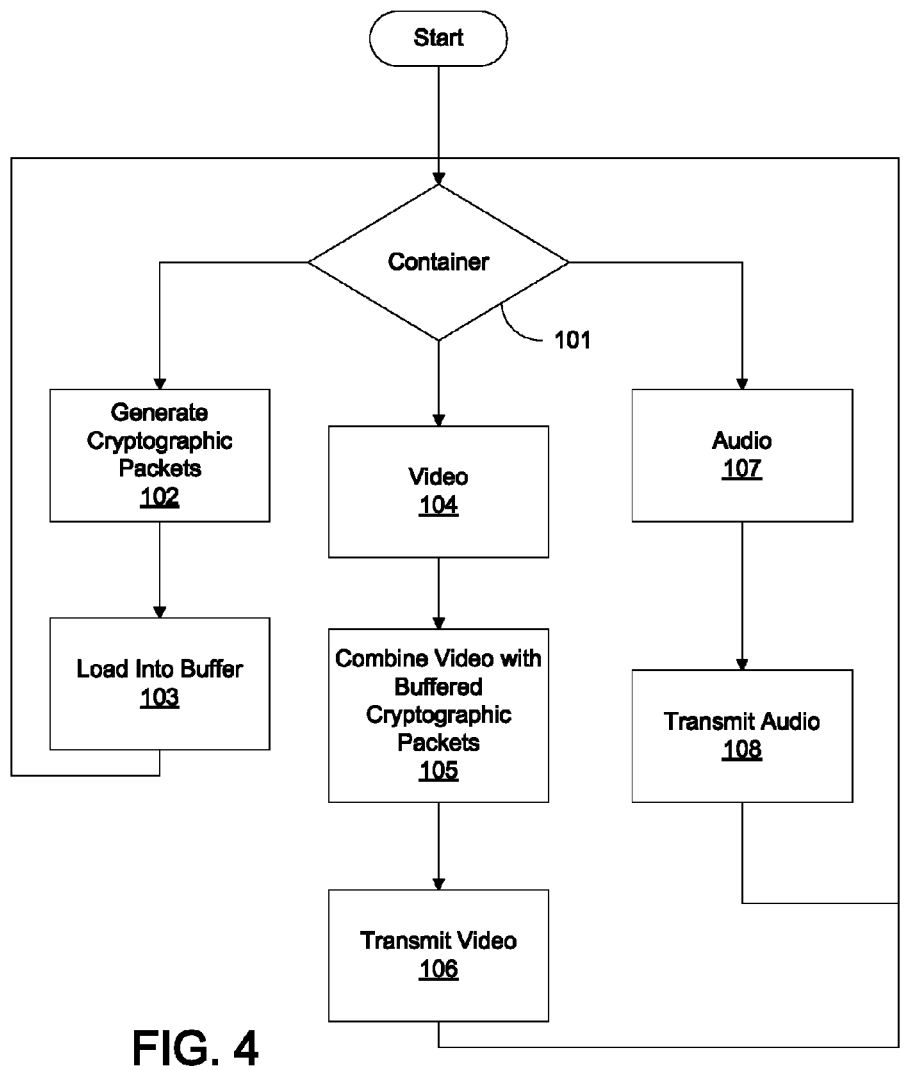
FIG. 4 is a flow diagram of a demultiplex and authentication process in accordance with various embodiments of the present invention.

The general processes of the demultiplexer and the decoder are now described. In FIG. 4, the demultiplexer and authentication process is illustrated in which a multimedia container file is received and portions of which are identified or separated (101). If encryption data is identified, cryptographic packets or material are generated (102) and stored in a temporary buffer (103). However, if video data is identified (104), the cryptographic material stored in the temporary buffer is combined with the video data (105) and then transmitted to a video decoder (106). If audio data is identified (107), the audio data is transmitted (108) to the audio decoder. It should be appreciated that audio or other types of data may also include encryption data and thus associated cryptographic material is generated and combined with the associated data and transmitted to the respective decoder. Also, other types of data may be included in the container file without encryption data and thus is transmitted directly to the associated decoder.

Figure 5:
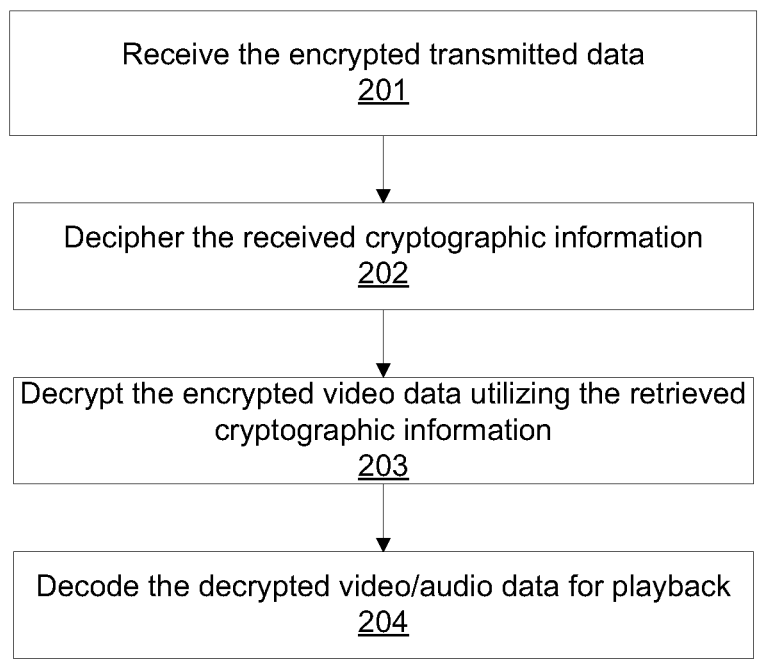
FIG. 5 is a flow diagram of a decoder and decipher process in accordance with various embodiments of the present invention.

In FIG. 5, a decoder and decipher process is illustrated in which the decoder receives video and/or audio data sent from the demultiplexer (201). The decoder deciphers the cryptographic material supplied with the associated data (202). Utilizing the deciphered material, the encrypted data is decrypted (203) and decoded (204) by the decoder for playback.

To further elaborate on the demultiplexer and decoder processes and the bitstream transport system, a more detailed representation of the demultiplexer's and decoder's associated digital rights manager along with the associated processes are illustrated in the remaining figures.

Figure 6:
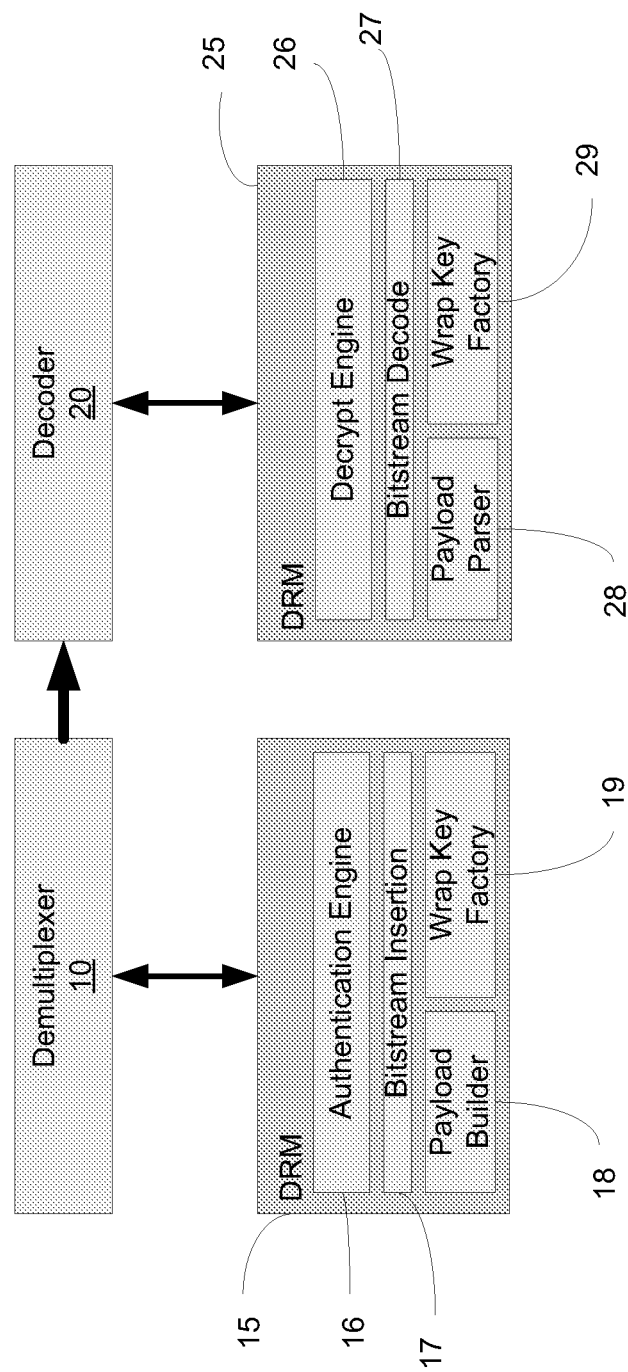
FIG. 6 is a block diagram of a multimedia cryptographic bitstream transport system in accordance with various embodiments of the present invention.

Referring to FIG. 6, the upstream digital rights manager 15 of the demultiplexer 10 includes an authentication engine 16, a bit stream inserter 17, a payload builder 18 and a wrap key factory 19. The downstream digital rights manager 25 of the decoder includes a decrypt engine 26, a bit stream decoder 27, a payload parser 28 and a wrap key factory 29. The authentication engine prepares cryptographic material utilizing the encryption data from the container file and the video data in conjunction with the payload builder 18 and the wrap key factory 19.

The payload builder 18 provides discrete units of cryptographic material in the bitstream delimited by an identifier. On the decoder, the payload parser 28 utilizes the identifiers to extract the discrete units, which are then processed by the decrypt engine 26. In many embodiments, the cryptographic material in one embodiment includes a bitstream frame header along with a cryptographic payload. The cryptographic payload, however, is not dependent on the format of the header of the elementary bitstream, e.g., MPEG-4 or H.264.

In one embodiment, the payload builder 18 inserts a reserved start code identifier along with a cryptographic payload at the front of each video chunk that is demultiplexed. By utilizing a reserved start code, the decrypt engine 26 can pass the entire video data including the inserted cryptographic material to the decoder 20 that simply discards or ignores the cryptographic material. For example, a MPEG-4 compliant decoder discards frames that contain a reserved start code identifier that is included in the bitstream. Accordingly, removal of any of the cryptographic material from the bitstream is not needed to decode the associated data.

The cryptographic payload in one embodiment includes three different packet types: a wrap key, a synchronization payload and a frame payload. The frame payload indicates that the current frame is encrypted and includes key information and a reference to at least a portion of the encoded frame that is encrypted. The frame payload can be used to decrypt the video frame. The synchronization payload is the first packet sent to synchronize the authentication engine of the demultiplexer to the decrypt engine of the decoder. This synchronization ensures that data transmitted from the demultiplexer to the decoder is not being intercepted. The wrap key includes information to unwrap or decipher the transmitted data from the demultiplexer.

The bit stream inserter 17 packages the cryptographic material for transport with the video data. Conversely, the bit stream decoder 27 of the decoder unpacks the cryptographic material from the bitstream. In one embodiment, frame keys are transported in the bitstream and are sent when a key index change is detected by the authentication engine of the demultiplexer. In many embodiments, the decrypt engine of the decoder stores only one frame key and thus frame encryption information sent by the demultiplexer applies to the current frame. If the decrypt engine receives a new frame key from the demultiplexer, the decrypt engine stores the new frame key and uses it to decrypt the next frame. In a number of embodiments, a key table is transmitted and stored in the decrypt engine for reference by subsequent encryption information. In several embodiments, the decoder does not enforce key rotation. In many embodiments, however, the decoder expects a new frame key after a predetermined number of frames in the sequence of frames. In this way, the decrypt engine can identify when supplied frame information is unreliable and terminate the decoding of the multimedia bitstream.

The wrap key factory 19 encrypts or wraps the cryptographic material for transport on the bitstream to the decoder. In one embodiment, the wrap key factory uses a key wrap process based on the Advanced Encryption Standard [AES] and uses the ECB Cipher Mode to provide cryptographic security for wrapping small blocks of data using chaining and cipher feedback loop. The key wrap process is stateless. A corresponding wrap key factory is included with the decoder to unwrap the cryptographic material. Synchronization with the corresponding wrap key factory 29 is used to allow unwrapping of the material without communication back to the demultiplexer [i.e., bi-directional communication] and to prevent unauthorized decoding of the content by, for example, a rogue process intercepting or copying the transmitted content.

Wrap Key Factory

In one embodiment, each of the authentication and decryption blocks (digital rights managers 15, 25) construct a series of predictable transform number sequences using a common heuristic. Subsequently, those numbers are combined with a random value for additional entropy used to contribute toward key material for wrapping keys.

Figure 7:
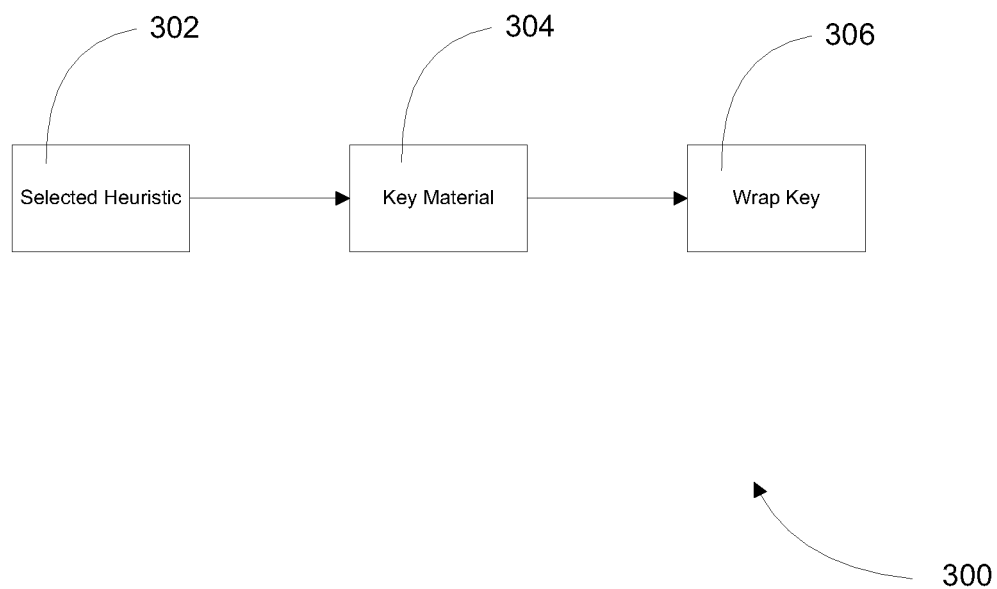
FIG. 7 is a flow diagram of a wrap key generation process in accordance with various embodiments of the present invention.

A flow diagram of a wrap key generation process 300 in accordance with an embodiment of the invention is illustrated in FIG. 7. A selected heuristic (302) is combined with key material (304) to create a wrap key (306).

In accordance with various embodiments, one such heuristic (302) may combine the use of a predictable number sequence generator such that identical transform sequences can be generated by different heuristics even though no information is exchanged. If both authentication and decrypt blocks are created such that the output of the common heuristic are identical, the key material (304) generated from such heuristic will be identical. This may apply in situations where a wrapped key (306) and a selected heuristic (302) are provided. Any process for generating identical encryption keys without exchange of key material can be used as an appropriate heuristic to generate wrapping keys (306) in accordance with embodiments of the invention. Although, some information exchange to enable synchronization between the two wrap key factories can be utilized in accordance with embodiments of the invention.

The two wrap key factories use the same transform sequence. To synchronize the wrap key factories, the sender's wrap key factory selects one heuristic (302) from a predetermined set of heuristics to generate the key material for the next wrap key. The decoder factory will receive a known payload that has been encrypted with the sender's wrap key (306) generated using selected heuristic (302) from the known set of heuristics. The receiver then attempts to decrypt and verify the contents of the payload using each of the predetermined heuristics. If the material matches what is expected, then the receiver has identified the correct heuristic (302). If all the heuristics are exhausted, then this is considered a fatal error and decryption cannot continue.

Initially, the synchronization payload is used to assist the decrypt block in identifying the appropriate transform sequence quickly. Once the decrypt block locates the proper heuristic (302), the decrypt block wrap key factory utilizes that transform sequence for all subsequent transforms. In several embodiments, once a heuristic has exhausted all values, that heuristic will deterministically choose the next heuristic to use.

Run time synchronization is maintained through monotonically incrementing a wrap number that is incremented for each wrap key generated. If an error occurs using a particular wrap key (i.e. unallowable data present in the cryptographic payload), the wrap key factory will regenerate a new wrap key and subsequently increment the wrap number. In one embodiment, the frame payload received by the decrypt block contains a wrap number element. On the decrypt block, this wrap number element is compared with the internal wrap number of the decrypt block to determine if the current wrap key needs to be skipped. In one embodiment, the wrap key includes data fed into a cryptographic digest. The resulting bytes from the digest are then used to create an AES key. A new wrap key will be generated for each payload that is wrapped.

Bitstream Data Insertion

Figure 8:
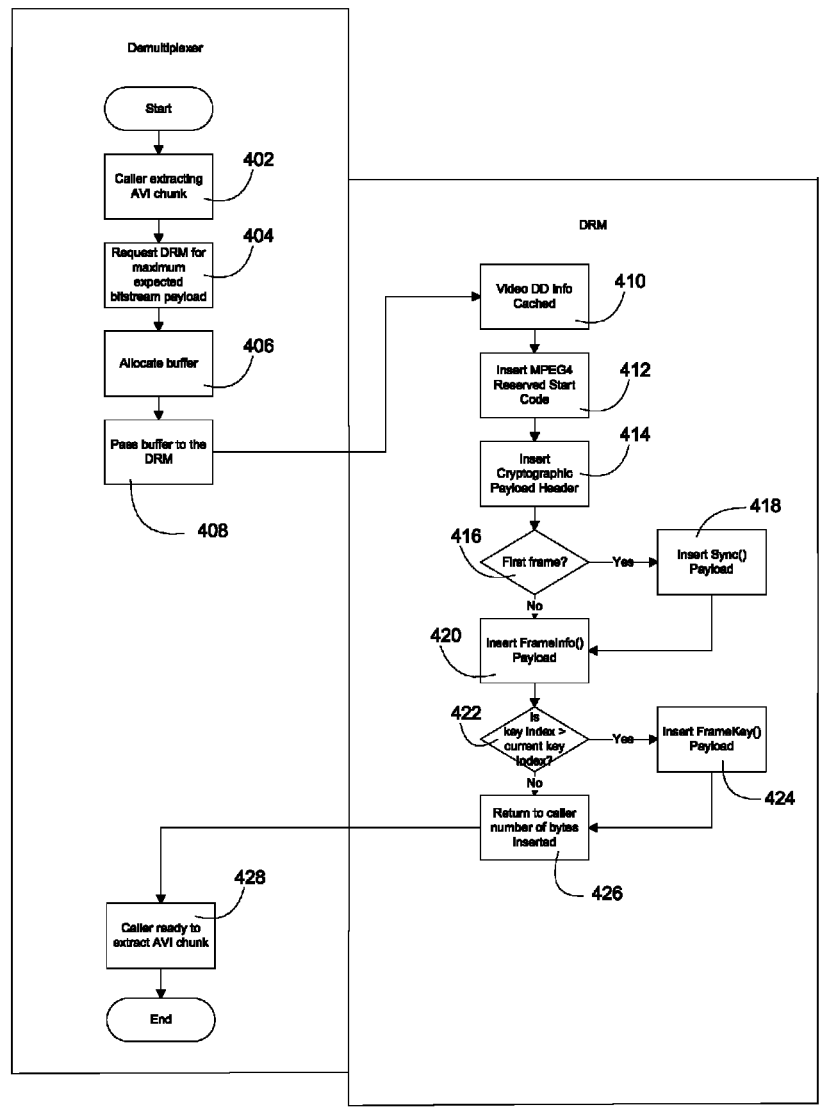
FIG. 8 is a flow diagram of a bitstream insertion process in accordance with various embodiments of the present invention.

A flow diagram of a bitstream insertion process 400 utilized with respect to video data extracted from an AVI container in accordance with an embodiment of the invention is illustrated in FIG. 8. In the demultiplexer, a caller begins extraction (402) of a relevant AVI chunk and requests (404) the DRM for the maximum expected bitstream payload. The demultiplexer then uses the information from the DRM to allocate (406) space in a buffer and passes (408) the buffer to the DRM. Next on the DRM, the video DD info is cached (410). The video DD info may be a data segment in a file container describing the data contained in a single block of container data, such as all of the video frame data in a single AVI chunk. Encrypted frames may have a DD info which contains information relating to the security features of the frame. The MPEG4 reserved start code is inserted (412) into the buffer and then the cryptographic payload header is inserted (414) into the buffer. A decision (416) is then made as to whether the chunk is the first frame. If the chunk is the first frame, then a Sync( ) payload is inserted (418) and a FrameInfo( ) payload is inserted (420). The Sync( ) payload may include the wrap key synchronization payload to synchronize the wrap keys. The FrameInfo( ) payload may include the cryptographic offset and length of information relating to data security in the video data, possibly as part of the DD Info data. If the chunk is not the first frame, then only the FrameInfo( ) payload is inserted (420). Then, a decision (422) is made as to whether the key index is greater than the current key index. If the key index is greater than the current key index, a FrameKey( ) payload is inserted (424) in the buffer and then the number of bytes inserted into the buffer is returned (426) to the caller by the DRM. The FrameKey( ) payload may include the payload containing the next frame key. If the key index is not lower than the current key index, then the DRM returns (426) the number of bytes inserted in the buffer to the caller. Next, the demultiplexer, is ready to extract (428) the AVI chunk. Through this process, DD info awareness occurs before the demultiplexer extracts the video chunk into the buffer for transmission to the decoder.

In various embodiments, bitstream data insertion occurs in the authentication block of the demultiplexer. The digital rights manager in one embodiment first receives the container's encryption data and temporarily stores or caches the information. The cached encryption data contains the information for the next video chunk. From this information, the digital rights manager can determine the proper bitstream payload to insert, if any. To reduce memory copies, the digital rights manager inserts the bitstream payload before extracting the chunk from the container.

Based on the cached encryption data chunk, the digital rights manager can detect frame key changes. If the frame key index has not changed since the last cached encryption data, no key material is sent. In one embodiment, the encryption data is always transported if there is cached encryption data in the digital rights manager. On the first payload, there will be a synchronization payload to allow the decrypt block to synchronize the wrap sequence. The frame information payloads in one embodiment follow the synchronization payload. It should be appreciated that not all payloads are required to appear in each decrypt block. Furthermore, the processes similar to those described above with reference to FIG. 8 can also be used with respect to other container formats including but not limited to MKV container files.

Although the present invention has been described in certain specific aspects, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

What is claimed is:

1. A method of playing back encrypted video on a playback device, where at least partially encrypted video data is contained within a container file and can be extracted and decrypted to create an elementary bitstream using cryptographic information, which can be used to decrypt the at least partially encrypted video data, the method comprising:

extracting at least partially encrypted video data from a container file containing at least partially encrypted video data to create an at least partially encrypted elementary bitstream using a processor configured by a demultiplexer process;

obtaining cryptographic information using the processor configured by the demultiplexer process;

enciphering the cryptographic information using the processor configured by an upstream digital rights management component of the demultiplexer process;

inserting the enciphered cryptographic information into the at least partially encrypted elementary bitstream using the processor configured by the upstream digital rights management component of the demultiplexer process;

providing the at least partially encrypted elementary bitstream in which the enciphered cryptographic information is inserted to a video decoder process using the processor;

extracting the enciphered cryptographic information from the at least partially encrypted elementary bitstream using the processor configured by the video decoder process;

deciphering the enciphered cryptographic information using the processor configured by a downstream digital rights management component of the video decoder process;

decrypting the at least partially encrypted elementary bitstream with the cryptographic information using the processor configured by the downstream digital rights management component of the video decoder process; and decoding the elementary bitstream for rendering on a display device using the processor configured by the video decoder process;

wherein the enciphering process and the deciphering process are synchronized such that a delay in excess of a predetermined time between enciphering and deciphering results in the cryptographic information being unrecoverable.

2. The method of claim 1, wherein the cryptographic information is obtained from the container file.

3. The method of claim 1, wherein the cryptographic information comprises:
key information; and
information concerning at least a portion of the at least partially encrypted video data that is encrypted using the key information.

4. The method of claim 3, wherein the information concerning at least a portion of the at least partially encrypted video data is a reference to a block of encrypted data within an encoded frame of video that is encrypted using the key information.

5. The method of claim 4, wherein
the cryptographic information inserted in the elementary bitstream is delimited by an identifier; and
the cryptographic information is inserted before the at least partially encrypted video data encrypted using the key information.

6. The method of claim 5, wherein the cryptographic information is extracted using the identifier.

7. The method of claim 6, wherein the decrypting process is performed by using the key information to identify the encrypted portion of video data and decrypting the encrypted video data using the key information.

8. The method of claim 7, wherein cryptographic information inserted in different locations within the elementary bitstream includes different key information.

9. The method of claim 1, wherein the at least partially encrypted video data comprises:
frames of encoded video;
wherein at least a portion of a plurality of the encoded frames is encrypted.

10. The method of claim 1, wherein the enciphering process enciphers data by using a sequence of scrambling processes to scramble data.

11. The method of claim 10, wherein the deciphering process deciphers data by performing the inverse sequence of scrambling processes to the sequence used to scramble the data.

12. A system for playback of encrypted video, where at least partially encrypted video data is contained within a container file and can be extracted and decrypted to create an elementary bitstream using cryptographic information, which can be used to decrypt the at least partially encrypted video data, comprising:

a demultiplexer configured to extract at least partially encrypted video data from a container file containing at least partially encrypted video data to create an at least partially encrypted elementary bitstream; and a video decoder configured to decrypt the elementary bitstream using the cryptographic information and decode the at least partially encrypted elementary bitstream for rendering on a display device;

wherein the demultiplexer is configured to obtain cryptographic information, encipher the cryptographic information, and insert the enciphered cryptographic information into the at least partially encrypted elementary bitstream;

wherein the decoder is configured to extract enciphered cryptographic information from an at least partially encrypted elementary bitstream in which the enciphered cryptographic information is inserted, to decipher the cryptographic information, to decrypt the at least partially encrypted elementary bitstream with the cryptographic information, and to decode the elementary bitstream for rendering on a display device;

wherein the demultiplexer and the decoder are configured to synchronize the enciphering process and the deciphering process such that a delay in excess of a predetermined time between enciphering and deciphering results in the cryptographic information being unrecoverable.

13. The system of claim 12, wherein the cryptographic information is obtained from the container file.

14. The system of claim 12, wherein the cryptographic information comprises
key information; and
information concerning at least a portion of the at least partially encrypted video data that is encrypted using the key information.

15. The system of claim 14, wherein the information concerning at least a portion of the at least partially encrypted video data is a reference to a block of encrypted data within an encoded frame of video that is encrypted using the key information.

16. The system of claim 15, wherein the demultiplexer is configured to:
insert the cryptographic information delimited by an identifier in the elementary bitstream; and
insert the cryptographic information before the at least partially encrypted video data encrypted using the key information.

17. The system of claim 16, wherein the decoder is configured to extract the cryptographic information using the identifier.

18. The system of claim 17, wherein the decoder is configured to decrypt the portion of the video data encrypted using the key information by identifying the encrypted portion of video data and decrypting the encrypted video data using the key information.

19. The system of claim 18, wherein cryptographic information inserted in different locations within the elementary bitstream includes different key information.

20. The system of claim 12, wherein the at least partially encrypted video data comprises:
frames of encoded video;
wherein at least a portion of a plurality of the encoded frames is encrypted.

21. The system of claim 12, wherein both the demultiplexer and the decoder are configured to be synchronized such that a delay in excess of a predetermined time between enciphering and deciphering results in the cryptographic information being unrecoverable.

22. The system of claim 21, wherein the demultiplexer is configured to encipher data by using a sequence of scrambling processes to scramble data.

23. The system of claim 22, wherein the decoder is configured to decipher data by performing the inverse sequence of scrambling processes to the sequence used to scramble the data.

24. A method of playing back encrypted video on a playback device, where at least partially encrypted video data is contained within a container file and can be extracted and decrypted to create an elementary bitstream using cryptographic information, which can be used to decrypt the at least partially encrypted video data, the method comprising:

- obtaining the cryptographic information using a processor configured by a demultiplexer process,
- wherein the cryptographic information is obtained from the container file;
- wherein the at least partially encrypted video data comprises:
  - frames of encoded video; and
  - wherein at least a portion of a plurality of the encoded frames is encrypted;
- wherein the cryptographic information comprises:
- key information; and
- information concerning at least a portion of the least partially encrypted video data that is encrypted using the key information;
- wherein the information concerning at least a portion of the at least partially encrypted video data is a reference to a block of encrypted data within an encoded frame of video that is encrypted using the key information; and
- wherein cryptographic information inserted in different locations within the elementary bitstream includes different key information;
- extracting at least partially encrypted video data from a container file containing at least partially encrypted video data to create an at least partially encrypted elementary bitstream using the processor configured by the demultiplexer process,
- wherein the cryptographic information inserted in the elementary bitstream is delimited by an identifier; and
- wherein the cryptographic information is inserted before the at least partially encrypted video data encrypted using the key information;
- enciphering the cryptographic information using the processor configured by an upstream digital rights management component of the demultiplexer process;
- inserting the enciphered cryptographic information into the at least partially encrypted elementary bitstream using the processor configured by the upstream digital rights management component of the demultiplexer process,
- wherein the cryptographic information is extracted using the identifier;
- providing the at least partially encrypted elementary bitstream in which the enciphered cryptographic information is inserted to a video decoder process using the processor;
- extracting the enciphered cryptographic information from the at least partially encrypted elementary bitstream using the processor configured by the video decoder process;
- deciphering the enciphered cryptographic information using the processor configured by a downstream digital rights management component of the video decoder processor,
- wherein the enciphering process and the deciphering process are synchronized such that a delay in excess of a predetermined time between enciphering and deciphering results in the cryptographic information being unrecoverable;
- wherein the enciphering process enciphers data by using a sequence of scrambling processes to scramble data; and
- wherein the deciphering process deciphers data by performing the inverse sequence of scrambling processes in the sequence used to unscramble data;
- decrypting the at least partially encrypted elementary bitstream with the cryptographic information using the processor configured by the downstream digital rights management component of the video decoder process,
- wherein the decrypting process is performed by using the key information to identify the encrypted portion of video data and decrypting the encrypted video data using the key information; and
- decoding the elementary bitstream for rendering on a display device using the processor configured by the video decoder process;
- wherein the enciphering process and the deciphering process are synchronized such that a delay in excess of a predetermined time between enciphering and deciphering results in the cryptographic information being unrecoverable.

* * * * *